(12) United States Patent
Kamba

(10) Patent No.: US 11,622,070 B2
(45) Date of Patent: Apr. 4, 2023

(54) APPARATUS, METHOD, AND STORAGE MEDIUM

(71) Applicant: CANON KABUSHIKI KAISHA, Tokyo (JP)

(72) Inventor: Masaki Kamba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/700,254

(22) Filed: Mar. 21, 2022

(65) Prior Publication Data

US 2022/0311930 A1 Sep. 29, 2022

(30) Foreign Application Priority Data

Mar. 26, 2021 (JP) ............................. JP2021-053277

(51) Int. Cl.
*H04N 5/232* (2006.01)
(52) U.S. Cl.
CPC ..... *H04N 5/23212* (2013.01); *H04N 5/23296* (2013.01); *H04N 5/23299* (2018.08)
(58) Field of Classification Search
CPC ........... H04N 5/23212; H04N 5/23299; H04N 5/23296
USPC ..................................................... 348/345
See application file for complete search history.

(56) References Cited

U.S. PATENT DOCUMENTS

| 7,551,222 B2* | 6/2009 | Morofuji | H04N 5/232123 |
| | | | 348/211.12 |
| 9,781,332 B2* | 10/2017 | Eguchi | H04N 5/232133 |
| 11,394,868 B2* | 7/2022 | Uchida | H04N 5/232127 |
| 11,399,127 B2* | 7/2022 | Kamba | G02B 7/282 |
| 11,418,717 B2* | 8/2022 | Park | H04N 5/2251 |
| 2006/0170813 A1* | 8/2006 | Morofuji | H04N 5/232123 |
| | | | 348/E5.045 |
| 2010/0178045 A1* | 7/2010 | Hongu | G02B 7/282 |
| | | | 396/80 |
| 2013/0308932 A1* | 11/2013 | Nagao | G02B 7/102 |
| | | | 396/125 |
| 2014/0168383 A1* | 6/2014 | Murakami | H04N 13/296 |
| | | | 348/47 |
| 2017/0264812 A1* | 9/2017 | Kamba | H04N 5/232133 |
| 2018/0063412 A1* | 3/2018 | Uenishi | H04N 5/3696 |
| 2018/0217352 A1* | 8/2018 | Kamba | H04N 5/23245 |
| 2020/0124738 A1* | 4/2020 | Kim | G01S 7/51 |

(Continued)

FOREIGN PATENT DOCUMENTS

JP 2004126291 A 4/2004

*Primary Examiner* — Pritham D Prabhakher
(74) *Attorney, Agent, or Firm* — Canon U.S.A., Inc. IP Division

(57) ABSTRACT

An apparatus includes an imaging unit configured to capture an image formed by an optical system, a first unit configured to control the optical system to adjust a focal position of the optical system, a second unit configured to control a driving unit configured to change a direction of the imaging unit through pan or tilt driving, and a storage unit configured to store distance information where the direction and a subject distance are in association with each other. The first unit calculates a shift in the subject distance in a process in which the direction is changed from a first direction to a second direction through the pan or tilt driving, based on the stored distance information, and controls the optical system in accordance with the shift in the subject distance.

18 Claims, 9 Drawing Sheets

(56) References Cited

U.S. PATENT DOCUMENTS

2020/0177817 A1\* 6/2020 Osawa ............... H04N 5/23296
2020/0275014 A1\* 8/2020 Kamba .............. H04N 5/23296
2020/0344405 A1\* 10/2020 Okamoto ......... H04N 5/232123
2021/0099649 A1\* 4/2021 Park ........................ G01C 1/00

\* cited by examiner

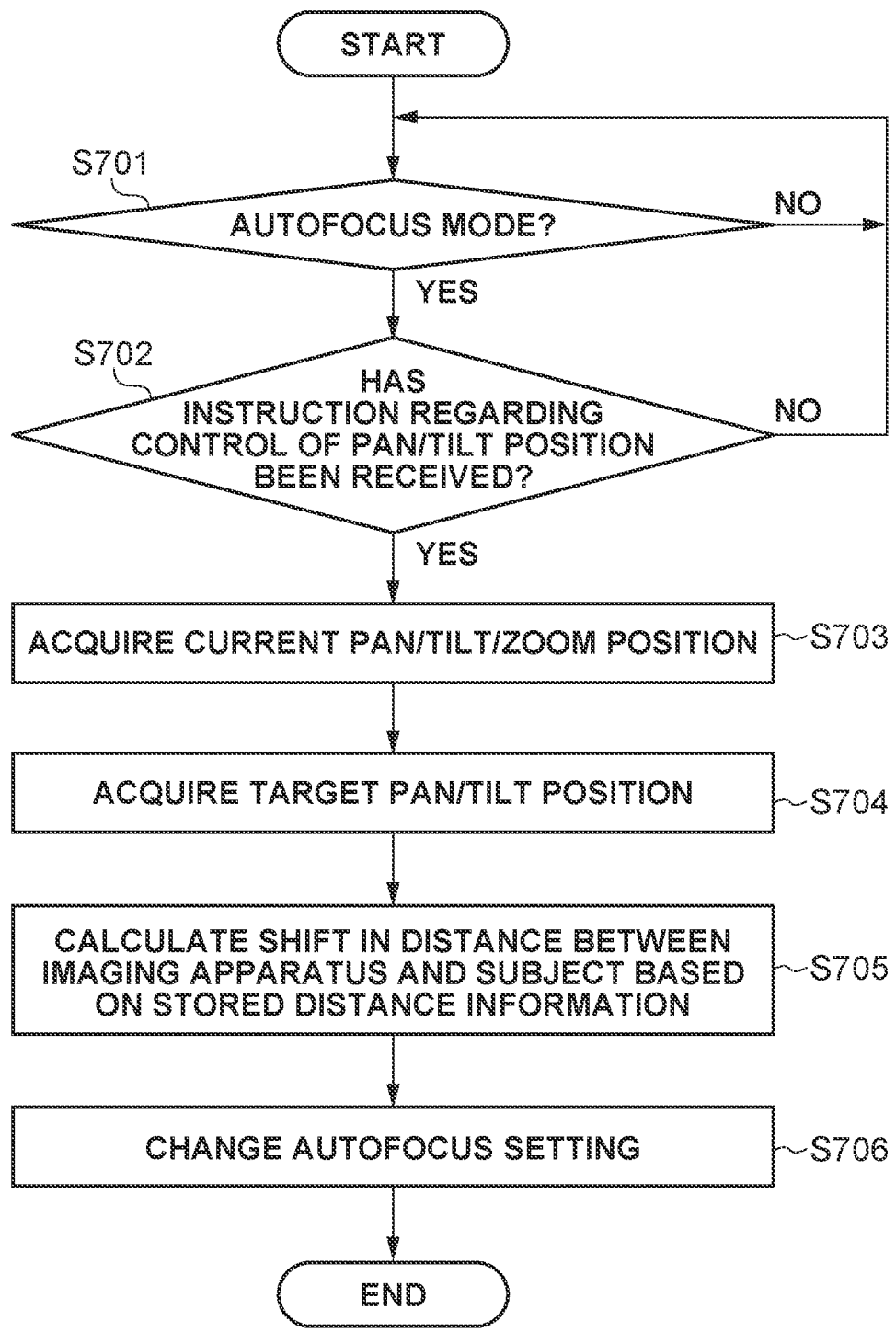

APPARATUS, METHOD, AND STORAGE MEDIUM

BACKGROUND

Technical Field

The aspect of the embodiments relates to an apparatus, a method, and a storage medium.

DESCRIPTION OF THE RELATED ART

Conventionally known is a technology regarding autofocus control for focusing on a subject as quickly as possible under a condition in which an imaging direction is controlled in a pan direction and/or a tilt direction (Japanese Patent Application Laid-Open No. 2004-126291).

SUMMARY

According to an aspect of the embodiments, an apparatus includes an imaging unit configured to capture an image formed by an optical system, a first unit configured to control the optical system to adjust a focal position of the optical system, a second unit configured to control a driving unit configured to change a direction of the imaging unit through pan or tilt driving, and a storage unit configured to store distance information in which the direction and a subject distance are in association with each other. The first unit is configured to calculate a shift in the subject distance in a process in which the direction is changed from a first direction to a second direction through the pan or tilt driving, based on the stored distance information, and control the optical system in accordance with the shift in the subject distance.

Further features of the present disclosure will become apparent from the following description of exemplary embodiments with reference to the attached drawings.

BRIEF DESCRIPTION OF THE DRAWINGS

FIG. 7 is a flowchart illustrating an example of processing of the imaging apparatus.

DESCRIPTION OF THE EMBODIMENTS

Figure 1:
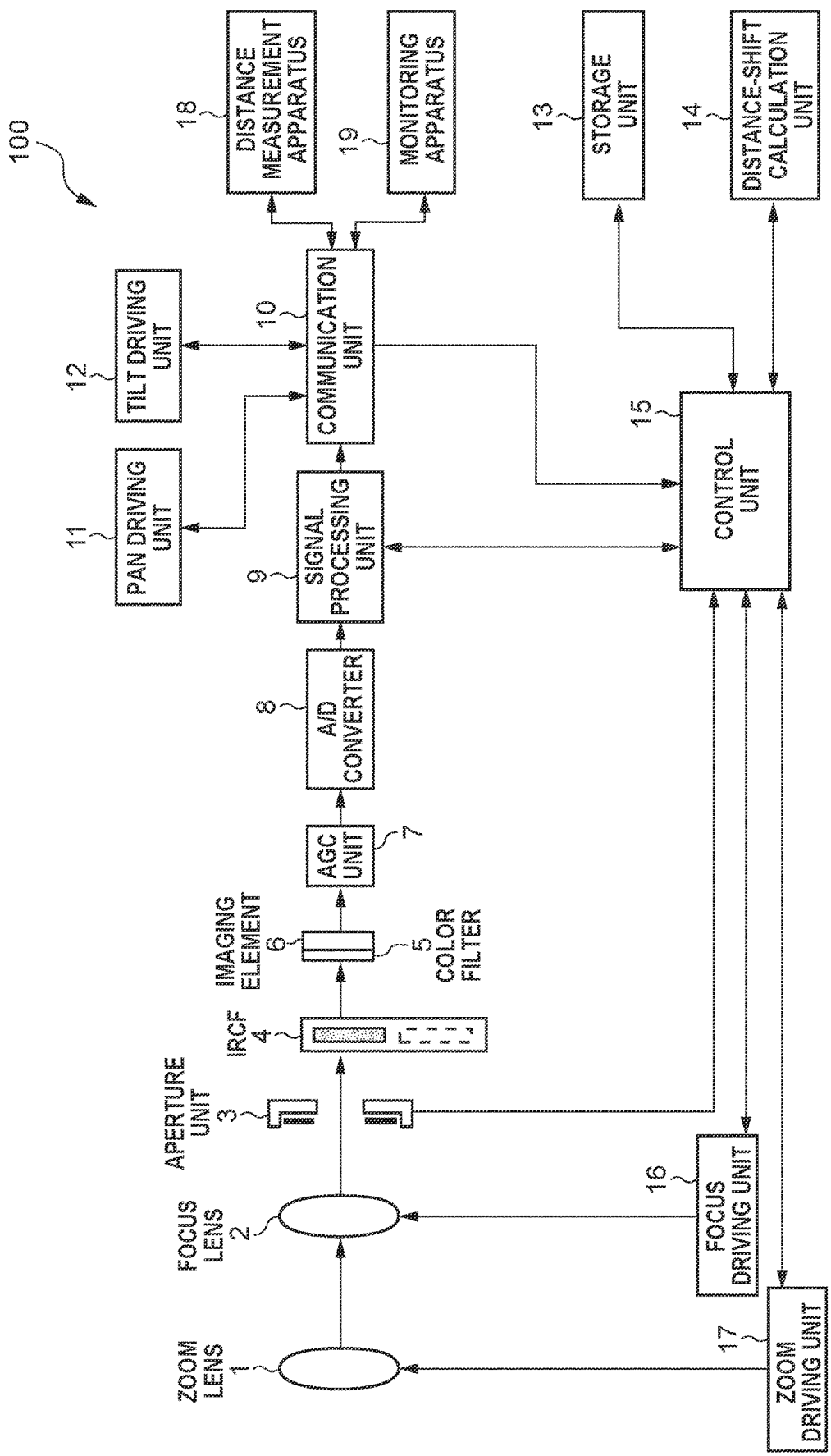
FIG. 1 is a diagram illustrating a configuration example of an imaging apparatus.

Exemplary embodiments of the present disclosure will be described in detail below with reference to the accompanying drawings.

In the present specification and the drawings, components having substantially identical functional configurations are denoted by identical reference signs, and overlapping descriptions thereof are omitted.

Configuration Example of Imaging Apparatus

A configuration example of an imaging apparatus according to an exemplary embodiment will be described with reference to FIG. 1. An imaging apparatus 100 according to the present exemplary embodiment includes a plurality of optical elements and an imaging optical system that forms an optical image of an object (subject). The imaging optical system included in the imaging apparatus 100 according to the present exemplary embodiment includes at least a configuration for adjusting a focal position (in other words, a configuration for controlling a position at which focus is achieved). As a specific example of the configuration for adjusting the focal position, the imaging optical system may include a focus lens 2 that is moved in an optical axis direction to adjust a focal point. The imaging optical system may include at least one of a zoom lens (magnification-varying lens) 1 for changing a focal length (in other words, controlling a zoom magnification), or an aperture unit 3 for adjusting a light amount.

A focus driving unit 16 schematically indicates a configuration for controlling a position of the focus lens 2 (for example, an actuator) to implement adjustment of the focal point of the imaging optical system. A zoom driving unit 17 schematically indicates a configuration for controlling a position of the zoom lens 1 to implement adjustment of the focal length of the imaging optical system (adjustment of the zoom magnification). Optical elements illustrated as the zoom lens 1 and the focus lens 2 can be substituted by a plurality of components that belongs to two or more units.

An optical image (subject image) formed by the imaging optical system is guided to an imaging element 6 via an infrared cut-off filter (IRCF) 4 and a color filter 5 to form an image, and the formed image is photoelectrically converted to electric signals by the imaging element 6. The optical element such as the IRCF 4 may be configured to be able to go forward/backward with respect to an optical path of the imaging optical system.

Electric signals (video signals) output from the imaging element 6 based on a result of imaging are subjected to gain adjustment by an automatic gain control (AGC) unit 7, subjected to analog to digital conversion to convert analog signals to digital signals by an analog/digital (A/D) converter 8, and then input to a signal processing unit 9. The signal processing unit 9 performs image processing on the input digital video signals, outputs the video signals after the image processing to a communication unit 10, and also calculates an evaluation value to be used for autofocus control using the video signals before or after the image processing. Examples of autofocus control include a method in which a focal point evaluated value (contrast) is used and a method in which a phase difference is used.

The signal processing unit 9 may change image processing on the input video signals depending on a state of the imaging optical system. As a specific example, in a case where the IRCF 4 is arranged on the optical axis of the imaging optical system, the signal processing unit 9 may operate in a day mode, thus controlling image processing which is performed on the input video signals such that a color image is output. In contrast, in a case where the IRCF 4 is not arranged on the optical axis of the imaging optical system, the signal processing unit 9 may operate as a night mode, thus controlling image processing which is performed on the input video signals such that a monochrome image is output.

A pan driving unit 11 and a tilt driving unit 12 schematically indicate configurations regarding control in the imaging direction of the imaging apparatus 100 according to the present exemplary embodiment (for example, an actuator).

Specifically, the pan driving unit 11, for example, rotates the imaging apparatus 100 in a pan direction to control the imaging direction of the imaging apparatus 100 along the pan direction. In other words, the pan driving unit 11 controls a pan angle of the imaging apparatus 100.

The tilt driving unit 12, for example, rotates the imaging apparatus 100 in a tilt direction to control the imaging direction of the imaging apparatus 100 along the tilt direction. In other words, the tilt driving unit 12 controls a tilt angle of the imaging apparatus 100.

A distance measurement apparatus 18 schematically indicates an apparatus that executes processing regarding measurement of a distance between a subject and the imaging apparatus 100 according to the present exemplary embodiment. A measurement method is not particularly limited to a specific one, and can be any methods with which the distance between the imaging apparatus 100 and the subject is measurable.

For example, the distance measurement apparatus 18 may use a plurality of imaging apparatuses, such as stereo cameras, to measure a distance between a target imaging apparatus and the subject based on the principle of triangulation using a parallax between images in accordance with results of the respective imaging apparatuses.

As another example, the distance measurement apparatus 18 may use a laser ranging instrument or a radar to measure the distance between the target imaging apparatus and the subject. For example, the distance measurement apparatus 18 may use a phase difference between emitted laser and reflected light of the emitted laser for measurement.

The distance measurement apparatus 18 may transmit information in accordance with a result of measurement of the distance between the imaging apparatus 100 and the subject to a control unit 15, which will be described below, via communication established by the communication unit 10.

A monitoring apparatus 19 acquires video signals output from the signal processing unit 9 via communication established by the communication unit 10, and displays an image based on the video signals on a predetermined output device such as a display, thus presenting the image to a user. The monitoring apparatus 19 may transmit various instructions regarding imaging to the control unit 15, which will be described below, via the communication established by the communication unit 10 to control operations of the focus driving unit 16 and the zoom driving unit 17. The monitoring apparatus 19 may transmit an instruction regarding control of the imaging direction of the pan driving unit 11 and/or the tilt driving unit 12 (for example, a command regarding pan driving and/or tilt driving) via the communication established by the communication unit 10 to control operations of the pan driving unit 11 and/or the tilt driving unit 12.

The control unit 15 controls various operations regarding imaging of the imaging apparatus 100 according to the present exemplary embodiment. For example, the control unit 15 may drive the focus driving unit 16 to control the position of the focus lens 2, thus adjusting the focal point of the imaging optical system. As a more specific example, the control unit 15 may control the focal position based on at least any one of parameters of a driving direction, a driving speed, a response speed, a driving range, each of which is related to the movement of the focus lens 2, and presence/absence of driving. As another example, the control unit 15 may drive the zoom driving unit 17 to adjust the focal length of the imaging optical system. The control unit 15 may drive at least one of the pan driving unit 11 and the tilt driving unit 12 via the communication unit 10 to adjust the imaging direction of the imaging apparatus 100.

The control unit 15 may acquire, from the distance measurement apparatus 18, information in accordance with a result of measurement of the distance between the imaging apparatus 100 and the subject (hereinafter also referred to as "distance information") to use the distance information for various types of control. In this case, the control unit 15 may store the acquired distance information in a storage unit 13 to hold the distance information. The storage unit 13 is a storage area in which various types of information are stored.

The control unit 15 may sequentially output the above-mentioned distance information in accordance with the result of measurement of the distance between the imaging apparatus 100 and the subject to a distance shift calculation unit 14, which will be described below, and thus cause the distance shift calculation unit 14 to calculate a shift in distance between the imaging apparatus 100 and the subject. In this case, the control unit 15 may use a result of calculation made by the distance shift calculation unit 14 regarding the shift in the distance between the imaging apparatus 100 and the subject for various types of control. Details of the control will be separately described below.

The distance shift calculation unit 14 calculates the shift in the distance between the imaging apparatus 100 and the subject based on information in accordance with the result of measurement of the distance between the imaging apparatus 100 and the subject sequentially output from the control unit 15. This configuration enables calculation of the shift in change in the distance, for example, in a case where the subject within an angle of view of the imaging apparatus 100 changes with change of the imaging direction of the imaging apparatus 100, and the distance between the imaging apparatus 100 and the subject thus changes.

Figure 2:
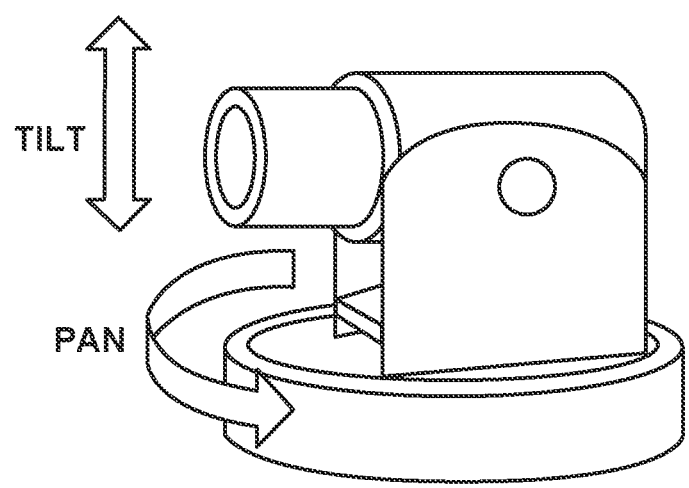
FIG. 2 is a diagram illustrating an outer appearance of the imaging apparatus.

For example, FIG. 2 is a diagram illustrating an example of an outer appearance of the imaging apparatus 100 according to the present exemplary embodiment, and illustrates an example of an outer appearance of a pan/tilt/zoom (PTZ) camera that is capable of pan/tilt/zoom control and is applicable as the imaging apparatus 100. In the example illustrated in FIG. 2, a case where a pan/tilt mechanism is integrated with the imaging apparatus 100 is illustrated, but it does not necessarily limit a configuration of the imaging apparatus 100 according to the present exemplary embodiment. As a specific example, an imaging system may be configured to be capable of performing pan control and tilt control with a combination of an electrically driven pan head and the imaging apparatus 100. Various instructions are transmitted from the control unit 15, the monitoring apparatus 19, and the like to the pan driving unit 11 and the tilt driving unit 12 to drive the pan driving unit 11 and the tilt driving unit 12, respectively, thus enabling pan control and tilt control of the imaging apparatus 100, respectively.

Figure 3:
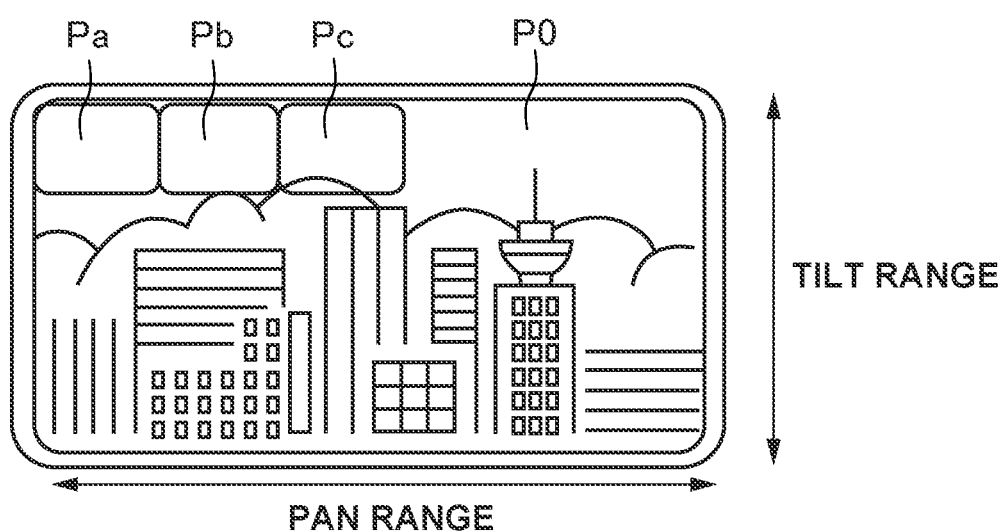
FIG. 3 is a diagram for describing an output angle of view and entire angle of view of a pan/tilt/zoom (PTZ) camera.

A description will be provided of an example of an output angle of view in a case where a pan/tilt/zoom position of the PTZ camera is controlled, and an entire angle of view at which the PTZ camera can perform imaging, with reference to FIG. 3. Images Pa, Pb, and Pc schematically indicate examples of images acquired in accordance with a result of imaging performed by the PTZ camera. An image P0 schematically indicates an image in a range in which the PTZ camera can perform imaging in accordance with a range of pan control (hereinafter also referred to as "pan range") and a range of tilt control (hereinafter also referred to as "tilt range"). That is, the image P0 is equivalent to an image obtained by sequentially performing imaging while controlling the imaging direction of the PTZ camera within the pan range and the tilt range, and connecting a series of images in accordance with a result of imaging together. In the following description, an imaging range corresponding to the image P0, that is, a range in which the imaging apparatus (PTZ camera) 100 can perform imaging and that is determined in accordance with the pan range and the tilt range is also referred to as an "entire angle of view" for the sake of convenience.

In a case of an imaging apparatus that is installed using a tripod or the like or an imaging apparatus that is fixed to the ceiling, the wall, or the like, it can be assumed that the entire angle of view is basically not changed (in other words, the entire angle of view is fixed). In the present exemplary embodiment, based on the assumption of the above, the distance measurement apparatus 18 measures the distance between the imaging apparatus 100 and the subject at each angle of view in accordance with the imaging direction, such as respective angles of view of the images Pa, Pb, and Pc, and creates distance information corresponding to the entire angle of view of the image P0 based on a result of measurement of the distance corresponding to each of a series of angles of view.

Specifically, after the PTZ camera (the imaging apparatus 100 according to the present exemplary embodiment) is installed, a trigger for the imaging apparatus 100 to create the distance information is applied in response to an instruction from a user (a photographer) via the monitoring apparatus 19. Respective instructions are transmitted to the pan driving unit 11, the tilt driving unit 12, and the control unit 15 via the communication unit 10 to achieve a focus at an angle of view, and thereafter the distance measurement apparatus 18 acquires the distance information in accordance with the result of measurement of the distance between the subject and the PTZ camera.

FIG. 1 illustrates an example of a case where the distance measurement apparatus 18 is arranged external to the imaging apparatus 100, but this does not necessarily limit the configuration of the imaging apparatus 100 according to the present exemplary embodiment. As a specific example, the imaging apparatus 100 and the distance measurement apparatus 18 may be integrally formed.

As another example, a part of a series of components of the imaging apparatus 100 illustrated in FIG. 1 may be arranged external to the imaging apparatus 100. As a more specific example, a component that plays a leading role in performing various types of control as with the control unit 15 may be implemented by another apparatus different from the imaging apparatus 100. In this case, the other apparatus corresponds to an example of an "information processing apparatus" that controls operations of the imaging apparatus 100.

<Processing>

Regarding an example of processing of the imaging apparatus 100 according to the present exemplary embodiment, a description will be provided separately of processing regarding storing of distance information and processing regarding focus control using the distance information with reference to FIGS. 4, 5A, 5B, 6A, 6B, and 7.

(Storing of Distance Information)

Figure 4:
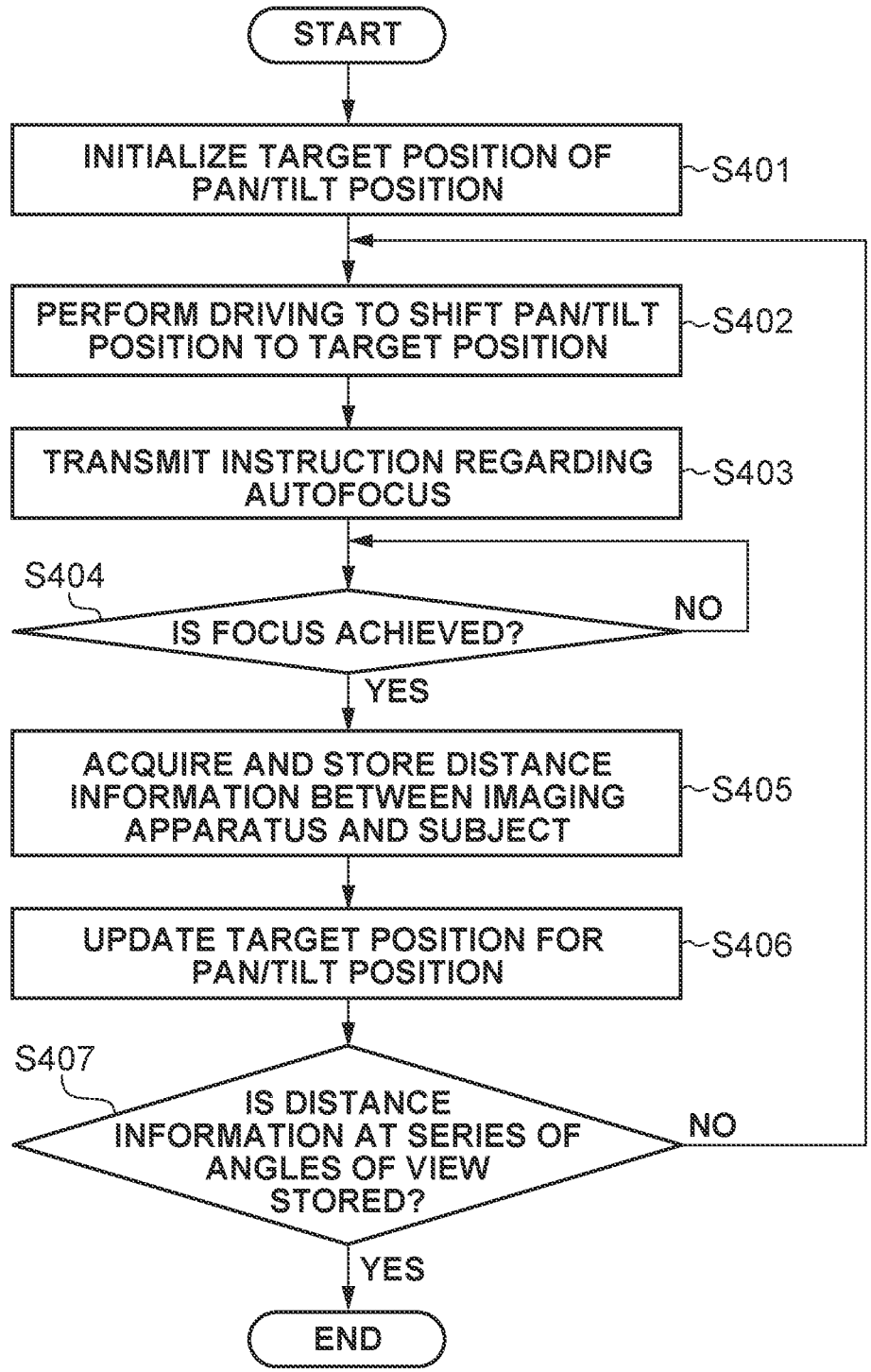
FIG. 4 is a flowchart illustrating an example of processing which is performed by the imaging apparatus.

An example of processing regarding acquisition of the distance information is first described with reference to FIG. 4. FIG. 4 illustrates an example of processing of measuring the distance between the imaging apparatus 100 and the subject in accordance with a position regarding pan/tilt control (hereinafter also referred to as a "pan/tilt position"), and storing the distance information in accordance with a result of measurement.

In step S401, the control unit 15 initializes a target position of the pan/tilt position in accordance with an instruction issued from the monitoring apparatus 19 via the communication unit 10.

In step S402, the control unit 15 drives the pan driving unit 11 and the tilt driving unit 12 in accordance with the instruction issued from the monitoring apparatus 19 via the communication unit 10 to shift the pan/tilt position to the target position.

In step S403 after the pan/tilt position reaches the target position, an instruction regarding autofocus is transmitted from the monitoring apparatus 19 to the control unit 15 via the communication unit 10.

In step S404, the control unit 15 determines whether a focus is achieved on the subject.

As long as it is determined that a focus is not achieved on the subject (NO in step S404), the control unit 15 continues autofocus control and makes the determination in step S404 anew.

If the control unit 15 determines that a focus is achieved on the subject (YES in step S404), the processing proceeds to step S405.

In step S405, the control unit 15 acquires distance information in accordance with a result of measurement of a distance between the imaging apparatus 100 and the subject (in other words, a result of measurement of a distance at an in-focus timing) from the distance measurement apparatus 18 via the communication unit 10, and causes the storage unit 13 to store the distance information.

In step S406, the control unit 15 updates the target position of the pan/tilt position in accordance with an instruction issued from the monitoring apparatus 19 via the communication unit 10. With this processing, the pan/tilt position to be served as a target of acquisition of the distance information (in other words, an angle of view in accordance with the pan/tilt position) is updated.

In step S407, the control unit 15 determines whether storing of the distance information at a series of angles of view (for example, the entire angle of view) has been completed.

In a case where the control unit 15 determines that the storing of the distance information at the series of angles of view has not been completed (NO in step S407), the processing proceeds to step S402. In this case, the operation in step S402 and the operations in subsequent steps is executed anew.

If the control unit 15 determines that the storing of the distance information at the series of angles of view has been completed (YES in step S407), a sequence of operations illustrated in FIG. 4 is terminated. In other words, as a result of completion of the sequence of processing illustrated in FIG. 4, the distance information in accordance with the result of measurement of the distance between the imaging apparatus 100 and the subject at each of the series of angles of view is stored in the storage unit 13.

Figure 5A:
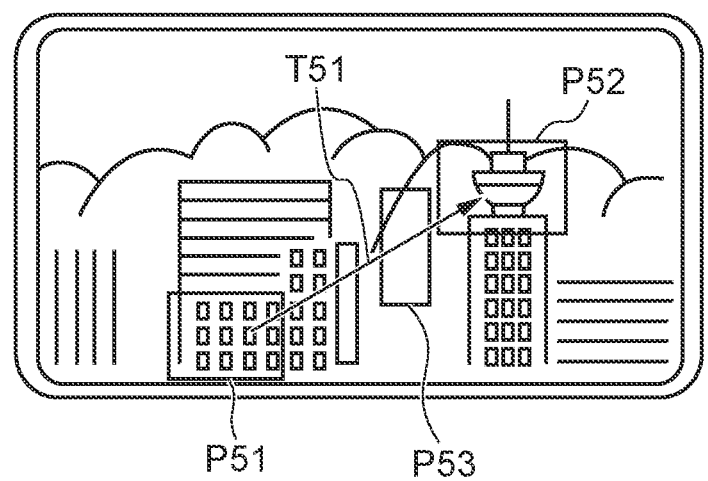
FIGS. 5A and 5B are diagrams each illustrating an example of a shift in change in a distance between the imaging apparatus and a subject.

An example of a shift in change in the distance between the imaging apparatus 100 and the subject, which is associated with the pan/tilt control, will be described with reference to FIGS. 5A and 5B. First, FIG. 5A will be described. An angle of view P51 schematically indicates an angle of view of the imaging apparatus 100 before the pan/tilt control. An angle of view P52 schematically indicates an angle of view of the imaging apparatus 100 in a case where the pan/tilt position reaches the target position with the pan/tilt control.

A trajectory T51 schematically indicates a trajectory of the pan/tilt position in a case where the pan/tilt position is moved in accordance with the pan/tilt control from a position corresponding to the angle of view P51 (start position) to a position corresponding to the angle of view P52 (target position).

For easier understanding of features of the technique according to the present disclosure, each of the following descriptions will be provided assuming that the pan/tilt position is linearly moved from the start position to the target position.

An imaging direction corresponding to the start position is equivalent to an example of a "first imaging direction", and an imaging direction corresponding to the target position is equivalent to an example of a "second imaging direction".

An angle of view P53 schematically indicates an angle of view corresponding to the pan/tilt position in a process of movement of the pan/tilt position along the trajectory T51. At each of the angles of view P51 and P52, a state of a short-distance view in which the subject within the angle of view of the imaging apparatus 100 is at a relatively near position is obtained. In contrast, at the angle of view P53, a state of a long-distance view in which the subject within the angle of view of the imaging apparatus 100 is at a far position as compared to the positions at the angles of view P51 and P52 is obtained.

In a case where a driving speed of the pan/tilt control is low, capturing an image of the long-distance view takes relatively long time. Thus, even in a case where focus control for achieving focus on the subject in the long-distance view is performed, it is unlikely that an issue becomes obvious. On the other hand, under a condition where the driving speed of the pan/tilt control is relatively high, for example, the subject in the short-distance view appears within the angle of view immediately after the start of the focus control for achieving focus on the subject in the long-distance view, and the focus control is switched to such focus control as to focus on the subject in the short-distance view. Under such a condition, there is a case where a phenomenon of visual recognition of flap of an image in accordance with a result of imaging becomes obvious. In a case where the long-distance view includes a subject with relatively low contrast, such as the sky and a mountain, it tends to take longer time before a focus is achieved. Hence, even in this case, there is a case where the phenomenon of visual recognition of flap of an image in accordance with the result of imaging becomes obvious.

Figure 5B:
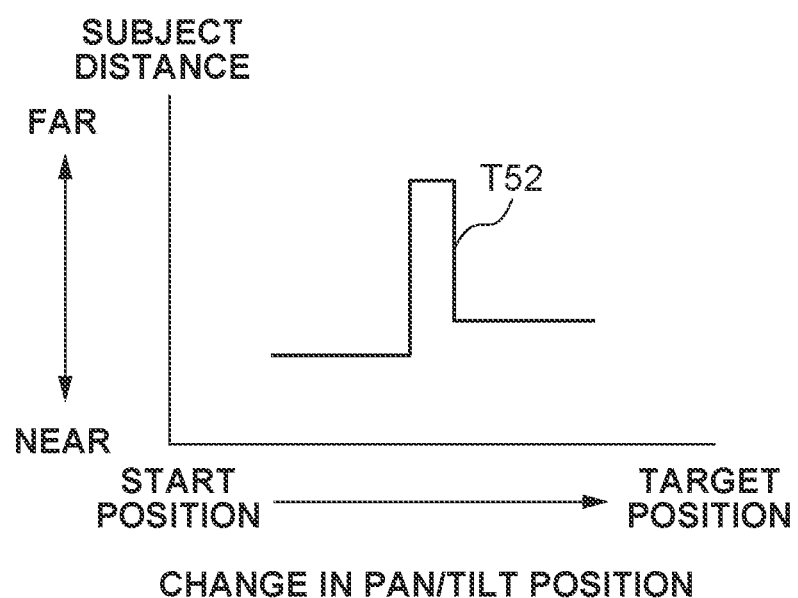

FIG. 5B will be next described. FIG. 5B is a graph illustrating an example of a change in the distance between the imaging apparatus 100 and the subject in a case where the pan/tilt position is moved from the start position to the target position. In FIG. 5B, an abscissa axis indicates a relative change in the pan/tilt position. An ordinate axis indicates the distance between the imaging apparatus 100 and the subject. A graph T52 indicates a change in the distance between the imaging apparatus 100 and the subject in a case where the pan/tilt control is performed to change the pan/tilt position along the trajectory T51 in the example illustrated in FIG. 5A. As indicated by the graph T52, it can be found that the long-distance view is temporarily obtained at the pan/tilt position corresponding to the angle of view P53, and the distance between the imaging apparatus 100 and the subject becomes long. In other words, at the pan/tilt position corresponding to the angle of view P53, the distance between the imaging apparatus 100 and the subject temporarily changes by an amount that is equal to or larger than an amount of change in the distance between the imaging apparatus 100 and the subject at the start position and the target position.

(Autofocus Control)

Subsequently, a description will be provided of an overview of control of changing a setting regarding autofocus in accordance with a shift in the pan/tilt position as an example of autofocus control in a case where the pan/tilt control is performed, with reference to FIGS. 6A and 6B. An abscissa axis and an ordinate axis in each of FIGS. 6A and 6B are similar to the abscissa axis and the ordinate axis in FIG. 5B.

Figure 6A:
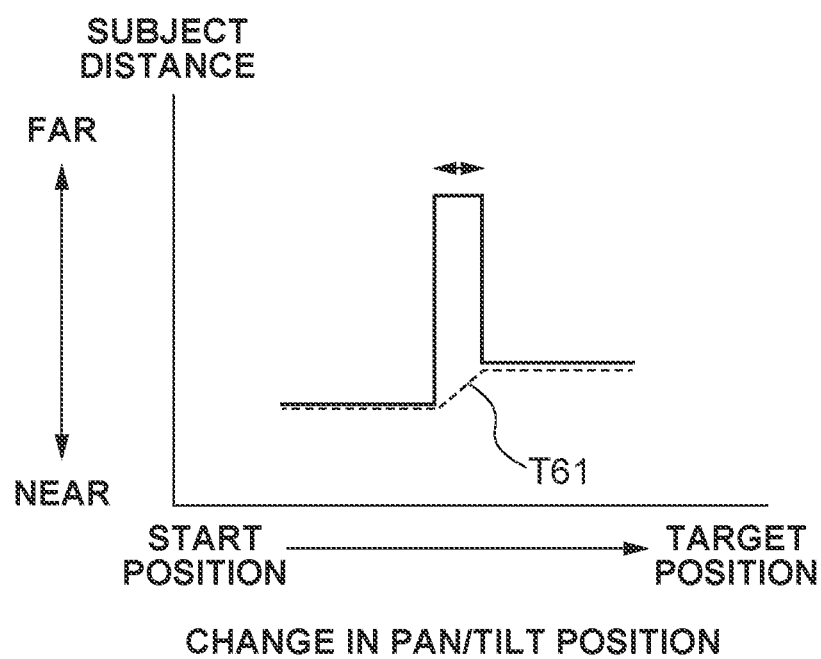
FIGS. 6A and 6B are diagrams each illustrating an example of focus control associated with pan/tilt control.

FIG. 6A will be initially described. FIG. 6A illustrates an example of a case where the pan/tilt position is moved from the start position to the target position, and where a period in which the distance between the imaging apparatus 100 and the subject (subject distance) temporarily changes is relatively short (for example, a period for change is equal to or less than a threshold). In FIG. 6A, a graph T61 indicated by a broken line schematically indicates a shift in an in-focus position of the imaging apparatus 100 according to the present exemplary embodiment. Specifically, in the example illustrated in FIG. 6A, with the movement of the pan/tilt position, the focus state is temporarily changed from a state of a short-distance view in which the distance between the imaging apparatus 100 and the subject is relatively short to a state of a long-distance view in which the distance is relatively long. In other words, a period in the state of the long-distance view is relatively short. For this reason, the imaging apparatus 100 inhibits control of achieving focus on a subject in the long-distance view in the period in which the image temporarily becomes the state of the long-distance view.

Figure 6B:
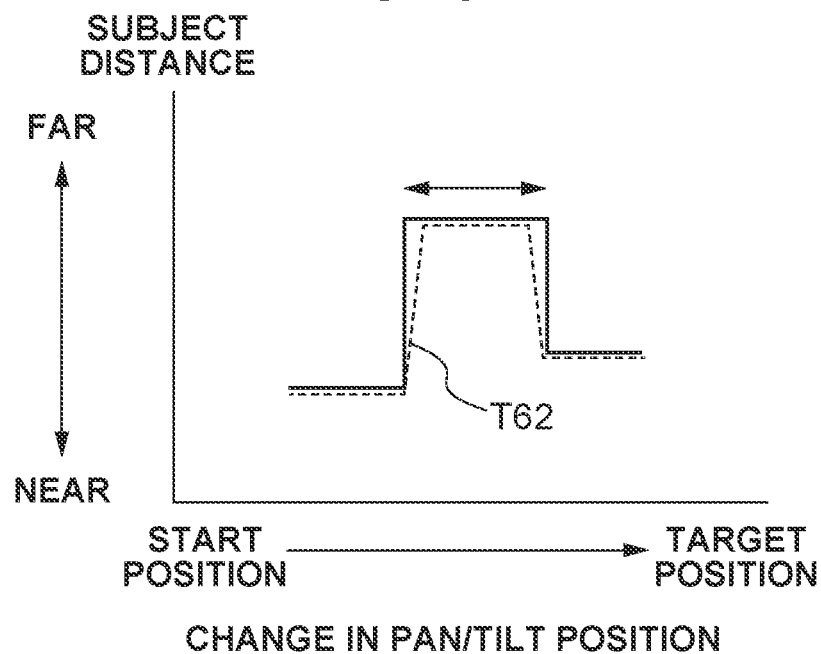

FIG. 6B will be next described. FIG. 6B illustrates an example of a case where the pan/tilt position is moved from the start position to the target position, and where a period in which the distance between the imaging apparatus 100 and the subject (subject distance) temporarily changes is relatively long (for example, the period for change exceeds the threshold). In FIG. 6B, a graph T62 indicated by a broken line schematically indicates a shift in the in-focus position of the imaging apparatus 100 according to the present exemplary embodiment. Specifically, in the example illustrated in FIG. 6B, with the movement of the pan/tilt position, the focus state is temporarily changed from a state of a short-distance view in which the distance between the imaging apparatus 100 and the subject is relatively short to a state of a long-distance view in which the distance is relatively long. That is, a period in the state of the long-distance view is relatively long. For this reason, the imaging apparatus 100 focuses on a subject in the long-distance view in the period in which the state of the long-distance view is temporarily obtained.

The period in which the distance between the imaging apparatus 100 and the subject temporarily changes can be changed depending on a speed regarding control of the pan/tilt position and a zoom magnification. For this reason, the distance shift calculation unit 14 may, for example, calculate the period in which the distance between the imaging apparatus 100 and the subject temporarily changes based on these parameters. In this case, the distance shift calculation unit 14 may, for example, acquire information regarding a current pan/tilt position from the pan driving unit 11 and the tilt driving unit 12 via the communication unit 10, and acquire information regarding a current zoom magnification from the control unit 15. The distance shift calculation unit 14 may acquire information in accordance with a result of measurement of the distance between the imaging apparatus 100 and the subject from the distance measurement apparatus 18 via the communication unit 10. Thereafter, the distance shift calculation unit 14 may calculate the period in which the distance between the imaging apparatus 100 and the subject temporarily changes, based on the acquired series of information.

Calculating the period in which the distance between the imaging apparatus 100 and the subject temporarily changes in this manner also enables inhibition of focus control to have a trajectory indicated by the graph T61, for example, in a case where the period is equal to or less than one second. A threshold for a distance used for determination as to whether to inhibit the focus control may be changed in accordance with an instruction from a user (for example, a photographer). Also in a case where the focus control is performed to have a trajectory indicated by the graph T62, the usage of the distance information stored in the storage unit 13 for the focus control enables, for example, prevention of search for a focus in an opposite direction and implementation of a smooth focus shift.

Subsequently, an example of processing of changing a setting regarding the focus control in accordance with a shift in the pan/tilt position as illustrated in FIGS. 6A and 6B will be described with reference to FIG. 7.

In step S701, the control unit 15 determines whether an operation mode regarding focus control is an autofocus mode.

If the control unit 15 determines that the operation mode is not the autofocus mode (NO in step S701), the control unit 15 waits for an instruction to change the operation mode to the autofocus mode.

If the control unit 15 determines that the operation mode is the autofocus mode (YES in step S701), the processing proceeds to step S702.

In step S702, the control unit 15 checks driving states of the pan driving unit 11 and the tilt driving unit 12, and determines whether the pan driving unit 11 and the tilt driving unit 12 have received the instruction regarding control of the pan/tilt position.

If the control unit 15 determines that the pan driving unit 11 and the tilt driving unit 12 have not received the instruction regarding control of the pan/tilt position (NO in step S702), the processing proceeds to step S701. In this case, the operations in steps S701 and S702 are executed anew.

On the other hand, if the control unit 15 determines that the pan driving unit 11 and the tilt driving unit 12 have received the instruction regarding control of the pan/tilt position (in other words, the pan driving unit 11 and the tilt driving unit 12 are in the driving states) (YES in step S702), the processing proceeds to step S703.

In step S703, the control unit 15 acquires information regarding the current pan/tilt position from the pan driving unit 11 and the tilt driving unit 12. The control unit 15 acquires information regarding a zoom position in accordance with control states of the focus driving unit 16 and the zoom driving unit 17.

In step S704, the control unit 15 acquires the pan/tilt position (target position) to be served as a target of the pan/tilt control. At this time, the control unit 15 may acquire information about a position regarding control of the pan driving unit 11 and the tilt driving unit 12 and corresponding to the target position from the pan driving unit 11 and the tilt driving unit 12.

In step S705, the distance shift calculation unit 14 calculates a shift in the distance between the imaging apparatus 100 and the subject based on the information regarding the current pan/tilt/zoom position acquired in step S703 and the information regarding the pan/tilt position to be served as the target and acquired in step S704.

In step S706, the control unit 15 changes a setting regarding autofocus based on a result of calculation of the shift in the distance between the imaging apparatus 100 and the subject in step S705, and thereafter ends a sequence of processing illustrated in FIG. 7.

The sequence of processing illustrated in FIG. 7 is repeatedly executed until the pan/tilt position reaches the target position. This enables a change of the setting regarding the autofocus in accordance with the shift in the pan/tilt position.

As described above, the imaging apparatus according to the present exemplary embodiment stores the distance information in accordance with the result of measurement of the distance between the imaging apparatus and the subject at each pan/tilt position, and calculates the shift in the pan/tilt position associated with the pan/tilt control using the distance information. Thereafter, the imaging apparatus performs the focus control (in other words, control of the focal position) in accordance with the result of calculation of the shift in the pan/tilt position. With this processing, for example, even under a condition in which the distance between the imaging apparatus and the subject temporarily changes, it is possible to prevent flap of an image from becoming obvious by temporarily inhibiting the focus control, and implement smooth focus control.

While the description has been provided of the exemplary embodiment, the exemplary embodiment does not necessarily limit application targets of the disclosure, and can be modified and changed in various manners without departing from the gist of the disclosure.

The above description has been provided focusing on the case of using a lens-integrated type imaging apparatus in which the imaging optical system and the main body of the imaging apparatus are integrated with each other, this does not limit a configuration of the imaging apparatus according to the present exemplary embodiment. As a specific example, the aspect of the embodiments can be applied to an imaging system (optical apparatus) including the main body of the imaging apparatus and the imaging optical system (so-called interchangeable lens) configured to be detachably mounted onto the imaging apparatus.

<Modification>

A modification of the imaging apparatus 100 according to the present exemplary embodiment will be described below with reference to FIGS. 8A, 8B, and 9. In the present modification, a description will be provided of an example of control performed in a case where a distance between the imaging apparatus 100 and the subject in focus is different from stored distance information with respect to a pan/tilt position at that time. In the present modification, a description will be provided focusing on parts different from the above-mentioned exemplary embodiment, and a detailed description of parts substantially similar to those of the exemplary embodiment will be omitted.

Figure 8A:
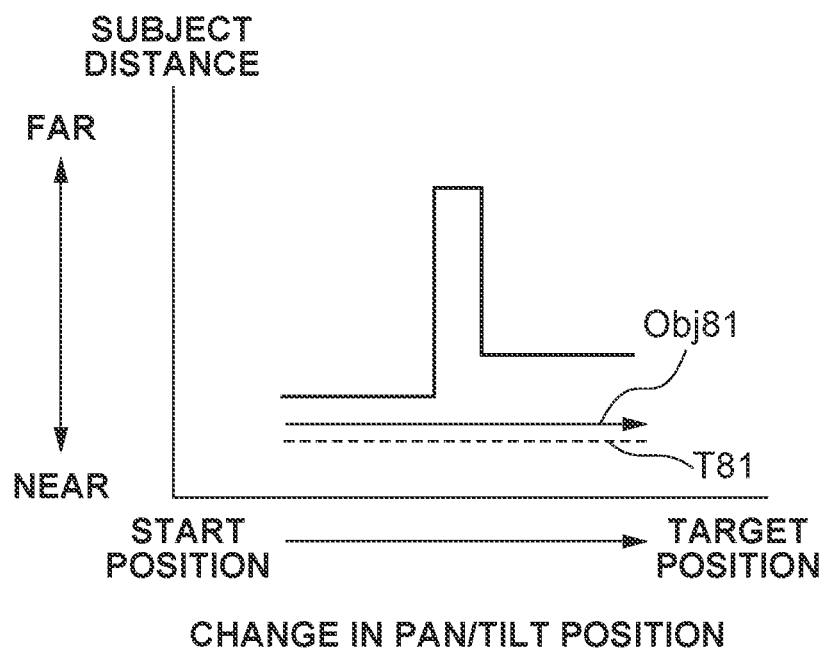
FIGS. 8A and 8B are diagrams each illustrating an example of focus control associated with pan/tilt control.
Figure 8B:
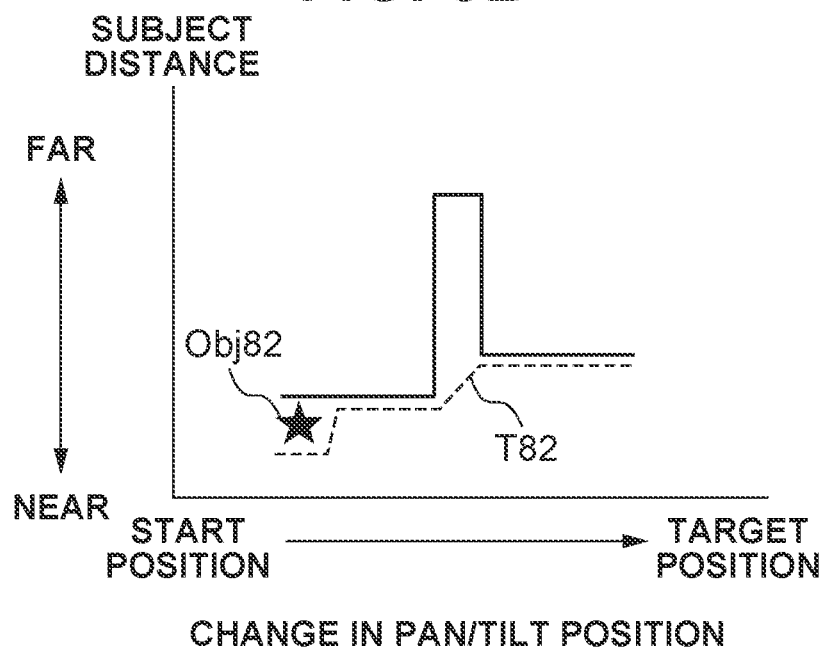

FIGS. 8A and 8B will be initially described. FIGS. 8A and 8B are diagrams for describing an overview of control to change a setting regarding autofocus in accordance with a shift in a pan/tilt position, as an example of autofocus control in a case of performing pan/tilt control.

As a specific example, FIG. 8A illustrates an example of focus control in a case of performing control of the pan/tilt position following the movement of a moving subject Obj81 in a state where the moving subject Obj81 is in focus. Specifically, in the example illustrated in FIG. 8A, control of the pan/tilt position is performed in a state where the subject Obj81 is in focus is maintained. Thus, in this case, regardless of the shift in the pan/tilt position, the state where the distance between the imaging apparatus 100 and the subject is different from the stored distance information with respect to the pan/tilt position at that time is maintained. A graph T81 indicated by a broken line schematically indicates a shift in an in-focus position of the imaging apparatus 100 according to the present exemplary embodiment.

In this case, the stored distance information is not used, and normal focus control to cause the in-focus position to follow a trajectory indicated by the graph T81 is applied.

As another example, FIG. 8B illustrates an example of focus control in a case where, from a state where a stationary subject Obj82 is in focus, the subject Obj82 goes out of frame with control of the pan/tilt position. Specifically, in the example illustrated in FIG. 8B, in a state where the subject Obj82 is within the angle of view, the distance between the imaging apparatus 100 and the subject is different from the stored distance information with respect to the pan/tilt position at that time. On the other hand, in a state where the subject Obj82 is outside the angle of view, the distance between the imaging apparatus 100 and the subject is matched with the stored distance information with respect to the pan/tilt position at that time. A graph T82 indicated by a broken line schematically indicates a shift in the in-focus position of the imaging apparatus 100 according to the present exemplary embodiment.

In this case, such focus control as to cause the in-focus position to follow the trajectory indicated by the graph T82 is applied. Specifically, in a state where the subject Obj82 is within the angle of view, normal focus control to bring the subject Obj82 into focus is applied. On the other hand, after the subject Obj82 goes out of frame, the focus control using the distance information is applied as in the example described with reference to FIG. 6A.

Subsequently, an example of processing of changing a setting regarding the focus control in accordance with the shift in the pan/tilt position, as illustrated in FIGS. 8A and 8B will be described with reference to FIG. 9. Since the operations in steps S901 to S903 are substantially similar to those in steps S701 to S703 described in FIG. 7, detailed descriptions thereof are omitted.

In step S904, the control unit 15 reads out distance information corresponding to a current pan/tilt position from the storage unit 13 to acquire the distance information.

In step S905, the control unit 15 determines whether the distance between the imaging apparatus 100 and the subject in focus is matched with the distance information acquired in step S904.

If the control unit 15 determines that the distance between the imaging apparatus 100 and the subject in focus is not matched with the distance acquired in step S904 (NO in step S905), the processing proceeds to step S901. In this case, the operations in step S901 and subsequent steps are executed anew.

On the other hand, if the control unit 15 determines that the distance between the imaging apparatus 100 and the subject in focus is matched with the distance acquired in step S904 (YES in step S905), the processing proceeds to step S906.

The control unit 15 makes the determination based on the distance between the imaging apparatus 100 and the subject in step S905, but other conditions may be applied to the determination. As a specific example, the control unit 15 makes the determination using a combination with a function regarding detection of a face, a human body, or the like, a function regarding tracking of an object, or another function.

Since operations in steps S906 to S908 are substantially similar to those in steps S704 to S706 described in FIG. 7, a detailed description thereof is omitted. That is, the distance shift calculation unit 14 calculates the shift in the distance between the imaging apparatus 100 and the subject during the control of the pan/tilt position. The control unit 15 changes a setting regarding autofocus based on a result of the calculation of the shift in the distance between the imaging apparatus 100 and the subject, and thereafter ends a sequence of processing described in FIG. 9.

Figure 9:
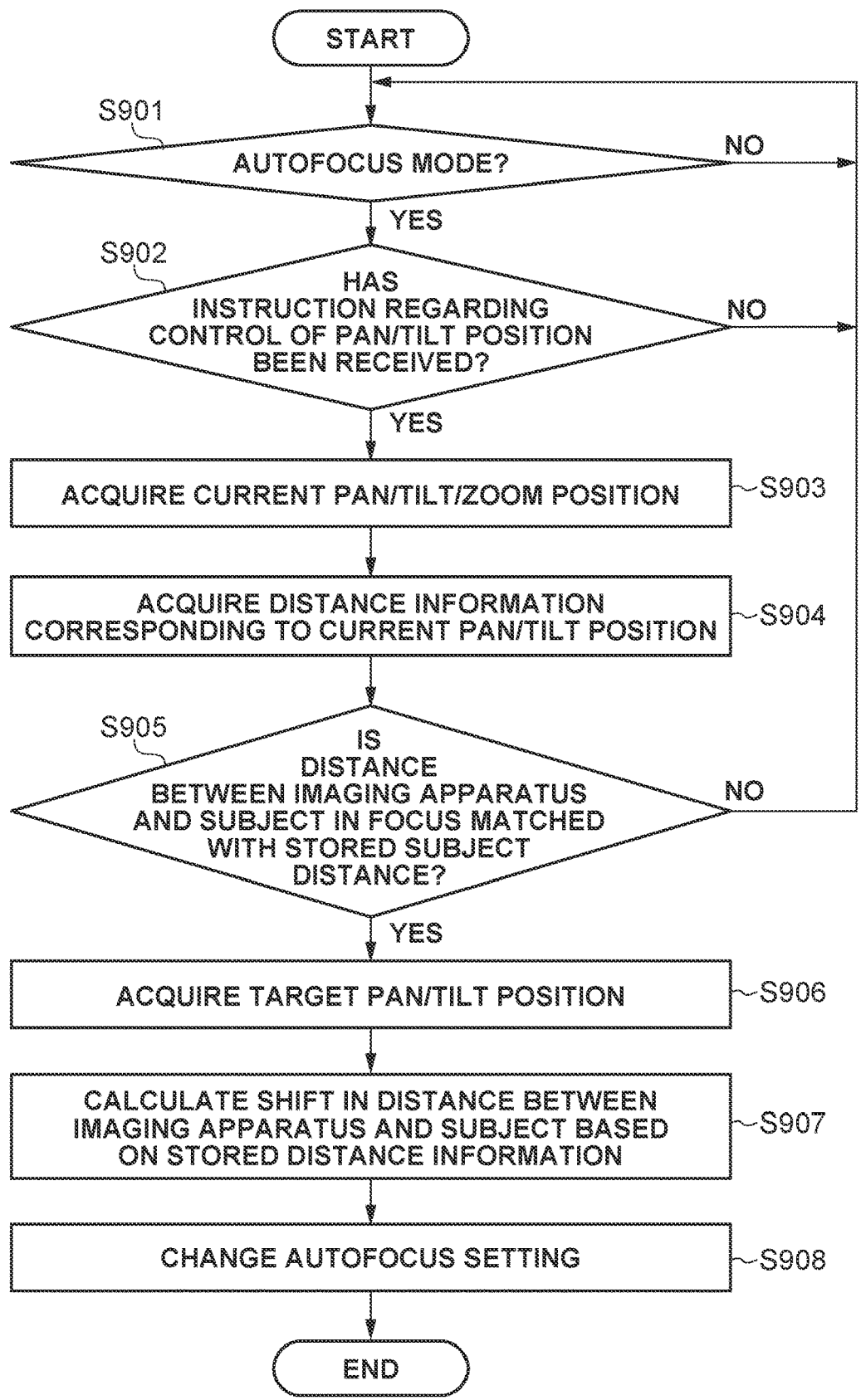
FIG. 9 is a flowchart illustrating an example of processing which is performed by the imaging apparatus.

The sequence of processing described in FIG. 9 is repeatedly executed until the pan/tilt position reaches the target position. This enables change of the setting regarding the autofocus in accordance with the shift in the pan/tilt position.

As described above, the imaging apparatus according to the present exemplary embodiment stores the distance information in accordance with the result of measurement of the distance between the imaging apparatus and the subject at each pan/tilt position, and calculates the shift in the pan/tilt position associated with the pan/tilt control using the distance information. Thereafter, the imaging apparatus performs the focus control (in other words, control of the focal position) in accordance with a result of calculation of the shift in the pan/tilt position. With this processing, for example, even under a condition in which the distance between the imaging apparatus and the subject temporarily changes, it is possible to prevent flap of an image from becoming obvious by temporarily inhibiting the focus control, and implement smooth focus control.

While the description has been provided of favorable exemplary embodiments, these do not necessarily limit application targets of disclosure, and can be modified and changed in various manners without departing from the gist of the disclosure.

The above description has been provided focusing on the case of using the lens-integrated type imaging apparatus in which the imaging optical system and the main body of the imaging apparatus are integrated with each other, this is not intended to limit the configuration of the imaging apparatus according to the present exemplary embodiment. As a specific example, the aspect of the embodiments can be applied to an imaging system (optical apparatus) including the main body of the imaging apparatus and the imaging optical system (interchangeable lens) configured to be detachably mounted onto the imaging apparatus.

Other Exemplary Embodiments

The disclosure can also be achieved by installing a program that implements one or more functions of the exemplary embodiments described above in a system or an apparatus via a network or a storage medium, and one or more processors in the system or a computer of the apparatus loading and executing the program. Furthermore, the disclosure can also be achieved by a circuit (for example, application-specific integrated circuit (ASIC)) that implements one or more functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-053277, filed Mar. 26, 2021, which is hereby incorporated by reference herein in its entirety.

What is claimed is:

1. An apparatus comprising:
an imaging unit configured to capture an image formed by an optical system;
a first unit configured to control the optical system to adjust a focal position of the optical system;
a second unit configured to control a driving unit configured to change a direction of the imaging unit through pan or tilt driving; and
a storage unit configured to store distance information in which the direction and a subject distance are in association with each other,
wherein the first unit is configured to:
calculate a shift in the subject distance in a process in which the direction is changed from a first direction to a second direction through the pan or tilt driving, based on the stored distance information; and
control the optical system in accordance with the shift in the subject distance.

2. The apparatus according to claim 1, wherein, in the process in which the direction is changed from the first direction to the second direction, in a case where the subject distance is changed by an amount of a shift that is equal to or larger than an amount of a shift between the subject distance in the first direction and the subject distance in the second direction, the first unit is configured to inhibit, in a case where a period for a shift in the subject distance in the process is less than a threshold, control of the focal position in accordance with the shift in the subject distance in the process.

3. The apparatus according to claim 1, wherein the distance information is at least one of distance information in accordance with a result of distance measurement with a phase difference sensor, a laser sensor, or a radar sensor, and distance information calculated based on a position of at least a part of optical elements included in the optical system.

4. The apparatus according to claim 1, wherein the first unit is configured to control the focal position based on at least any one of parameters of a driving direction, a driving speed, a response speed, a driving range, each of which is related to driving of a position of at least a part of optical elements included in the optical system, and presence/absence of the driving.

5. The apparatus according to claim 4,
wherein the optical system is configured to control a zoom magnification, and
wherein the second unit is configured to change the at least any one of the parameters based on a driving speed regarding the change of the direction and the zoom magnification.

6. The apparatus according to claim 1, wherein, in a case where a distance at which a focus is achieved and a distance indicated by the distance information stored in association with the direction at a timing at which the focus is achieved are different from each other, the first unit is configured to inhibit control of the focal position in accordance with a result of calculation of the shift in the subject distance.

7. A method comprising:
capturing an image formed by an optical system;
controlling the optical system to adjust a focal position of the optical system;
controlling a driving unit configured to change a direction of an imaging unit through pan or tilt driving;
storing distance information that associates the direction and a subject distance with each other;
calculating a shift in change in the subject distance in a process in which the direction is changed from a first direction to a second direction through the pan or tilt driving, based on the stored distance information; and
controlling the optical system in accordance with the shift in change in the subject distance.

8. The method according to claim 7, further comprising, in the process, in a case where the subject distance is changed by an amount of shift that is equal to or larger than an amount of shift between the subject distance in the first direction and the subject distance in the second direction, inhibiting control of the focal position in accordance with a shift in the subject distance in the process in a case where a period for a shift in the subject distance in the process is less than a threshold.

9. The method according to claim 7, wherein the distance information is at least one of distance information in accordance with a result of distance measurement with a phase difference sensor, a laser sensor, or a radar sensor, and distance information calculated based on a position of at least a part of optical elements included in the optical system.

10. The method according to claim 7, further comprising controlling the focal position based on at least any one of parameters of a driving direction, a driving speed, a response speed, a driving range, each of which is related to driving of a position of at least a part of optical elements included in the optical system, and presence/absence of the driving.

11. The method according to claim 10, further comprising:
controlling a zoom magnification; and
changing the at least any one of the parameters based on a driving speed regarding the change of the direction and the zoom magnification.

12. The method according to claim 7, further comprising, in a case where a distance at which a focus is achieved and a distance indicated by the distance information stored in association with the direction at a timing at which the focus is achieved are different from each other, inhibiting control of the focal position in accordance with a result of calculation of the shift in the subject distance.

13. A non-transitory computer-readable medium storing a program for causing a computer to execute a method comprising:
capturing an image formed by an optical system;
controlling an optical system to adjust a focal position of the optical system;
controlling a driving unit configured to change a direction of an imaging unit through pan or tilt driving;
storing distance information that associates the direction and a subject distance with each other;
calculating a shift in the subject distance in a process in which the direction is changed from a first direction to a second direction through the pan or tilt driving, based on the stored distance information; and
controlling the optical system in accordance with the shift in the subject distance.

14. The non-transitory computer-readable medium according to claim 13, further comprising, in the process, in a case where the subject distance is changed by an amount of a shift that is equal to or larger than an amount of a shift between the subject distance in the first direction and the subject distance in the second direction, inhibiting control of the focal position in accordance with a shift in the subject distance in the process in a case where a period for the shift in the subject distance in the process is less than a threshold.

15. The non-transitory computer-readable medium according to claim 13, wherein the distance information is at least one of distance information in accordance with a result of distance measurement with a phase difference sensor, a laser sensor, or a radar sensor, and distance information calculated based on a position of at least a part of optical elements included in the optical system.

16. The non-transitory computer-readable medium according to claim 13, further comprising controlling the focal position based on at least any one of parameters of a driving direction, a driving speed, a response speed, a driving range, each of which is related to driving of a position of at least a part of optical elements included in the optical system, and presence/absence of the driving.

17. The non-transitory computer-readable medium according to claim 16, further comprising:
controlling a zoom magnification; and
changing the at least any one of the parameters based on a driving speed regarding the change of the direction and the zoom magnification.

18. The non-transitory computer-readable medium according to claim 13, further comprising, in a case where a distance at which a focus is achieved and a distance indicated by the distance information stored in association with the direction at a timing at which the focus is achieved are different from each other, inhibiting control of the focal position in accordance with a result of calculation of the shift in the subject distance.

* * * * *